(12) United States Patent
Stesikova

(10) Patent No.: US 9,359,519 B2
(45) Date of Patent: Jun. 7, 2016

(54) SURFACTANTS FOR AQUEOUS BASED COATINGS

(71) Applicant: BASF SE, Ludwigshafen (DE)

(72) Inventor: Elvira Stesikova, Ypsilanti, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/430,925

(22) PCT Filed: Oct. 8, 2013

(86) PCT No.: PCT/US2013/063854
§ 371 (c)(1),
(2) Date: Mar. 25, 2015

(87) PCT Pub. No.: WO2014/058864
PCT Pub. Date: Apr. 17, 2014

(65) Prior Publication Data
US 2015/0232682 A1    Aug. 20, 2015

Related U.S. Application Data

(60) Provisional application No. 61/712,553, filed on Oct. 11, 2012.

(51) Int. Cl.
C09D 133/00 (2006.01)
C08K 5/06 (2006.01)
C09D 7/12 (2006.01)

(52) U.S. Cl.
CPC .............. *C09D 133/00* (2013.01); *C08K 5/06* (2013.01); *C09D 7/1233* (2013.01)

(58) Field of Classification Search
CPC .............. C09D 7/12; C08K 5/05; C08K 5/06
USPC ........................................................ 524/376
See application file for complete search history.

(56) References Cited

U.S. PATENT DOCUMENTS

| | | | | |
|---|---|---|---|---|
| 4,731,190 A * | 3/1988 | O'Lenick, Jr. | ....... | C10M 105/18 508/497 |
| 5,376,170 A * | 12/1994 | Baker | ................. | B01F 17/0028 106/270 |
| 5,605,949 A | 2/1997 | Anchor et al. | | |
| 5,608,118 A * | 3/1997 | Dahlgren | ................. | C07C 43/11 568/625 |
| 5,661,121 A * | 8/1997 | Dahlgren | ................. | C07C 43/11 510/241 |
| 6,462,014 B1 * | 10/2002 | Johnson | ................. | C11D 1/835 510/237 |
| 6,610,751 B1 * | 8/2003 | O'Lenick, Jr. | ....... | B01F 17/0092 516/30 |
| 6,921,744 B2 | 7/2005 | Schmid et al. | | |
| 7,530,361 B2 | 5/2009 | Killeen et al. | | |
| 7,964,032 B2 | 6/2011 | Rajaraman et al. | | |
| 8,119,717 B2 * | 2/2012 | Anchor | ................. | C09D 5/024 524/379 |
| 2006/0143833 A1 * | 7/2006 | Lamalle | ................. | C14C 1/08 8/94.15 |
| 2010/0280162 A1 * | 11/2010 | Stesikova et al. | ............. | 524/376 |
| 2011/0256319 A1 | 10/2011 | Steinmetz | | |

FOREIGN PATENT DOCUMENTS

WO    WO 96/18711 A1 *   6/1996   ............... C11D 1/72

OTHER PUBLICATIONS

International Search Report dated Nov. 27, 2013.
Written Opinion of the International Searching Authority dated Nov. 27, 2013.
Ingegard Johansson, "Does Hydrophobe Branching Make a Surfactant More or Less Hydrophilic", Specialty Chemicals Magazine, Nov. 2004.
Anthony J. O'Lenick Jr., et al., "Guerbet Alcohols a Versatile Hydrophobe", Soap/Cosmetic/Chemical Specialties, Apr. 1987.

* cited by examiner

*Primary Examiner* — Rip A Lee
(74) *Attorney, Agent, or Firm* — Foley & Lardner LLP

(57) ABSTRACT

Disclosed are aqueous coating compositions comprising a branched alkyl alcohol ethoxylate oligomer of formula where m is 1 to 3 and where n is an average number such that Mn is from about 1030 to about 2400, at least one latex polymer and water. The compositions also preferably comprise at least one pigment such as titanium dioxide. The compositions are for instance architectural latex paints. The compositions are for instance free of alkyl phenol ethoxylate (APE) surfactants and are low or zero VOC (volatile organic compounds). The compositions are provided effectively long open film times with excellent leveling properties.

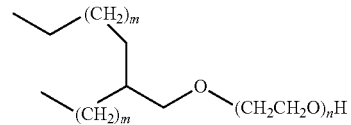

22 Claims, No Drawings

SURFACTANTS FOR AQUEOUS BASED COATINGS

Disclosed are surfactants for aqueous based coatings formulations. The formulations may be low VOC (volatile organic compound) or zero VOC. The formulations may also be alkyl phenol ethoxylate (APE) free.

Aqueous based coatings are desired that are low or zero VOC and are APE free. With such formulations, it is difficult to achieve sufficient "open film times". When a coating is applied to a substrate, effective application requires a relatively slow drying rate of the film. During the drying process, it is desired that a still liquid and thixotropic coating "levels", allowing brush strokes and imperfections, introduced during the application, to disappear. Formulations with short open film times do not allow the coating to level, thus for example brush marks are permanently engraved.

Surfactants that provide sufficient open film times to aqueous based coatings formulations that are low or zero VOC and are APE free are highly desired.

Surprisingly, it has been found that certain branched alkyl alcohol ethoxylate oligomer surfactants provide aqueous coatings formulations that are low or zero VOC and APE free outstanding open film times. The formulations have excellent leveling properties.

Accordingly, disclosed is an aqueous coating composition comprising
a branched alkyl alcohol ethoxylate oligomer of formula

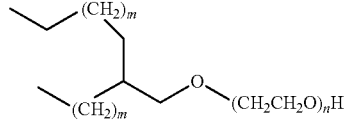

where m is 1 to 3 and n is an average number such that Mn is from about 1030 to about 2400,
at least one latex polymer and
water.

DETAILED DISCLOSURE

The branched alkyl alcohol ethoxylates are prepared from a Guerbet alcohol and ethylene oxide under known conditions. Conditions are described for example in "Polyoxyethylation of Alcohol", Ind. Eng. Chem., 1957, 49(11), pp. 1875-1878. 2-Propylheptanol is the Guerbet alcohol derived from pentanol. The degree of ethoxylation, n, is on average from about 20 to about 50. Preferably, the degree of ethoxylation is on average from about 30 to about 50. The degree of ethoxylation is also preferably on average from about 40 to about 50. The degree of ethoxylation preferably may also be on average from about 25, about 35 or about 45 to about 50.

The branched alkyl alcohol ethoxylates, being oligomers, are mixtures where the term "n" is an average number.

The branched alkyl alcohol ethoxylate oligomers are also described by their molecular weight. The number average molecular weight, Mn, determined by gel permeation chromatography, is from about 1030 to about 2400. For example, Mn may be about 1030, about 1040, about 1065, about 1425, about 1480, about 1765, about 1920, about 2180, about 2360 or about 2400. Mn may be a value within any of these values.

The HLB (hydrophilic/lipophilic balance) of the present branched alkyl alcohol ethoxylates is preferably 17 and above. Preferably, the HLB is 18 or above. HLB is determined according to the Griffin method that calculates HLB from 0 to 20.

The amount of the branched alkyl alcohol ethoxylate oligomers employed are from about 0.05% to about 5% by weight, based on the total weight of the aqueous coating composition. Preferably, the branched alkyl alcohol ethoxylates are employed from about 0.1% to about 3% by weight, based on the total weight of the coating composition. Most preferably, the branched alkyl alcohol ethoxylates are employed from about 0.2% to about 2% by weight, based on the total weight of the coating composition. Another preferred embodiment is from about 0.1% to about 1% by weight, based on the total weight of the coating composition.

The latex polymers used in the aqueous coating composition are preferably derived from monomers comprising at least one acrylic monomer selected from the group consisting of acrylic acid, acrylic acid esters, methacrylic acid and methacrylic acid esters. In addition, the latex polymer can optionally include one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid and ethylene. It is also possible to include $C_4$-$C_8$ conjugated dienes such as 1,3-butadiene, isoprene or chloroprene. Preferably, the monomers include one or more monomers selected from the group consisting of n-butyl acrylate, methyl methacrylate, styrene and 2-ethylhexyl acrylate. The latex polymers are typically selected from the group consisting of pure acrylics (comprising acrylic acid, methacrylic acid, an acrylate ester and/or a methacrylate ester as the main monomers); styrene acrylics (comprising styrene and acrylic acid, methacrylic acid, an acrylate ester and/or a methacrylate ester as the main monomers); vinyl acrylics (comprising vinyl acetate and acrylic acid, methacrylic acid, an acrylate ester and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide or acrylonitrile and/or one or more functional monomers such as itaconic acid or ureido methacrylate. In a particularly preferred embodiment, the latex polymer is a pure acrylic such as a butyl acrylate/methyl methacrylate copolymer or a ethylhexyl acrylate/methyl methacrylate copolymer derived from monomers including butyl acrylate, ethylhexyl acrylate and methyl methacrylate. In another particularly preferred embodiment, the latex polymer is a butyl acrylate/vinyl acetate copolymer. The latex polymer dispersion preferably includes from about 30 to about 75% solids and a mean latex particle size of from about 70 to about 650 nm. The latex polymers are preferably present in the aqueous coating composition in an amount from about 5 to about 60 percent by weight and more preferably from about 8 to about 40 percent by weight (i.e. the weight percentage of the dry latex polymer based on the total weight of the coating composition, that is, weight solids). Most preferably, the latex polymers are present from about 10% to about 45% by weight solids, based on the weight of the entire coating composition.

In the context of this invention, the term "latex polymer" includes both homopolymers and copolymers.

The aqueous coating composition preferably also includes at least one pigment. The term "pigment" as used herein includes non-film-forming solids such as pigments, extenders, and fillers. The at least one pigment is preferably selected from the group consisting of $TiO_2$ (in both anastase or rutile forms), clay (aluminum silicate), CaCO$_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as oxides of silicon, aluminum, sodium and potassium, CELITES (aluminum oxide and silicon dioxide, Celite Company), ATOMITES (English China Clay International) and ATTAGELS (BASF). More preferably, the at least one pigment includes TiO$_2$, CaCO$_3$ and/or clay. Generally, the mean particle sizes of the pigments range from about 0.01 to about 50 microns. For example, the TiO$_2$ particles used in the aqueous coating composition typically have a mean particle size of from about 0.15 to about 0.40 microns. The pigment can be added to the aqueous coating composition as a powder or in slurry form. The pigment is preferably present in the aqueous coating composition in an amount from about 5 to about 70 percent by weight, more preferably from about 20 to about 70 percent by weight, based on the total weight of the composition.

The coating composition can optionally contain additives such as one or more film-forming aids or coalescing agents. Suitable film-forming aids or coalescing agents include plasticizers and drying retarders such as high boiling point polar solvents. Other conventional coating additives such as, for example, dispersants, additional surfactants, wetting agents, rheology modifiers, defoamers, thickeners, biocides, mildewcides, colorants such as colored pigments or dyes, waxes, perfumes, co-solvents and the like, can also be used in accordance with the invention. For example, non-ionic and/or ionic (anionic or cationic) surfactants can be used to produce the polymer latex. These additives are typically present in the aqueous coating composition in an amount from 0.01 to about 15% by weight, more preferably from about 1 to about 10% by weight, based on the total weight of the coating composition.

The present aqueous coating compositions are preferably alkyl phenol ethoxylate (APE) free. That is, comprising essentially no or no APE surfactants. "Essentially no" means for instance less than 0.1% by weight, based on the weight of the total composition.

The present aqueous coating compositions are preferably low VOC or zero VOC (volatile organic compound) formulations. Volatile organic compounds traditionally employed in aqueous coatings are for instance coalescing agents and anti-freeze agents. Traditional coalescing agents include 2,2,4-trimethyl-1,3-pentanediol monoisobutyrate and 2-ethylhexyl benzoate. Traditional anti-freeze agents include ethylene glycol, diethylene glycol, propylene glycol, glycerol, ethanol, methanol, 1-methoxy-2-propanol, 2-amino-2-methyl-1-propanol and FTS-365 (freeze/thaw stabilizer from Inovachem Specialty Chem.). The present aqueous coating compositions preferably include less than 3% by weight and more preferably less than 1% by weight volatile organic compounds, based on the weight of the total composition. The present aqueous coating compositions most preferably contain essentially no or no volatile organic compounds. "Essentially no" means for instance less than 0.1% by weight, based on the weight of the total composition.

For the purposes of this disclosure volatile organic compounds are defined as those with an initial boiling point of less than or equal to 250° C. at standard atmospheric pressure, the European definition. The volatile organic compounds may also be defined according to the US EPA (Environmental Protection Agency) Method 24.

Accordingly, the present aqueous coating compositions have a VOC level of less than 10 g/L and preferably less than or equal to 5 g/L.

The balance of the aqueous coating compositions is water. Water is present in the latex polymer dispersion and is also generally added separately. Typically, the aqueous coating composition includes from about 10% to about 85%, preferably from about 35 to about 80% by weight water, based on the total weight of the composition. Stated another way, the total solids content of the aqueous coating composition is typically from about 15% to about 90%, preferably from about 20% to about 65% by weight, based on the total weight of the composition.

The present aqueous coating compositions are useful for architectural coatings, paper coatings, inks, varnishes, adhesives or caulks. Preferably, the present aqueous coating composition is an architectural latex paint. Most preferably, the present aqueous coating composition is an architectural latex flat paint, with a pigment load in the range from about 20% to about 70% by weight, based on the weight of the total composition. The latex solids of a flat paint vary from about 10% to about 45% by weight solids, based on the weight of the total composition.

The present aqueous coating compositions, which preferably contain essentially no or no APE surfactants and essentially no or no volatile organic compounds, are provided improved open film times. The present compositions are also provided excellent freeze/thaw stability.

The present architectural paints may be applied to a variety of substrates, including paper, wood, concrete, metal, glass, ceramics, plastics, plaster and roofing substrates or to previously painted or primed substrates.

The following embodiments more particularly point out the invention.

Embodiment 1

An aqueous coating composition comprising a branched alkyl alcohol ethoxylate oligomer of formula

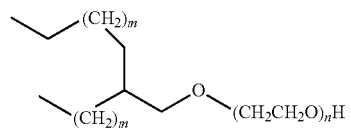

where m is 1 to 3 and n is an average number such that Mn is from about 1030 to about 2400, at least one latex polymer and water.

Embodiment 2

A composition according to embodiment 1 where the HLB of the branched alkyl alcohol ethoxylate is 17 or above.

Embodiment 3

A composition according to embodiment 1 where in the branched alkyl alcohol ethoxylate, Mn is from about 1425 to about 2400 and the HLB is 18 or above.

Embodiment 4

A composition according to embodiment 1 where in the branched alkyl alcohol ethoxylate, Mn is from about 1765 to about 2400 and the HLB is 18 or above.

Embodiment 5

A composition according to any of embodiments 1-4 where the branched alkyl alcohol ethoxylate is present from about 0.05% to about 5% by weight, preferably from about 0.1% to about 3% by weight, more preferably from about 0.2 to about 2% by weight or most preferably from about 0.1% to about 1% by weight, based on the total weight of the composition.

Embodiment 6

A composition according to any of embodiments 1-5 where the latex polymer is derived from monomers comprising at least one acrylic monomer selected from the group consisting of acrylic acid, acrylic acid esters, methacrylic acid and methacrylic acid esters and optionally comprising one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid and ethylene.

Embodiment 7

A composition according to any of embodiments 1-6 where the latex polymer is a pure acrylic, a styrene acrylic, a vinyl acrylic or an acrylated ethylene vinyl acetate polymer.

Embodiment 8

A composition according to any of embodiments 1-7 where the latex polymer is a copolymer comprising two or more monomers selected from the group consisting of butyl acrylate, methyl methacrylate, ethylhexyl acrylate and vinyl acetate.

Embodiment 9

A composition according to any of embodiments 1-8 where the latex polymer is present in the aqueous coating composition in an amount from about 5 to about 60 percent by weight, preferably from about 10 to about 45 percent by weight, dry latex polymer based on the total weight of the composition.

Embodiment 10

A composition according to any of embodiments 1-9 comprising one or more pigments selected from the group consisting of $TiO_2$, clay, $CaCO_3$, aluminum oxide, silicon dioxide, magnesium oxide, talc, barytes, zinc oxide, zinc sulfite, sodium oxide, potassium oxide and mixtures thereof.

Embodiment 11

A composition according to any of embodiments 1-10 comprising one or more pigments selected from the group consisting of $TiO_2$, clay and $CaCO_3$.

Embodiment 12

A composition according to any of embodiments 10 or 11 where the pigments are present from about 5 to about 70 percent by weight, preferably from about 20 to about 70 percent by weight, based on the weight of the total composition.

Embodiment 13

A composition according to any of embodiments 1-12 which comprises essentially no or no alkyl phenol ethoxylate surfactants.

Embodiment 14

A composition according to any of embodiments 1-13 which comprises less than 3% by weight, preferably less than 1% by weight volatile organic compounds, based on the weight of the total composition.

Embodiment 15

A composition according to any of embodiments 1-14 which comprises essentially no or no volatile organic compounds.

Embodiment 16

A composition according to any of embodiments 1-15 which is an architectural coating, paper coating, ink, varnish, adhesive or a caulk.

Embodiment 17

A composition according to embodiment 16 which is an architectural coating.

Embodiment 18

A composition according to any of embodiments 1-16 where m is 2.

Embodiment 19

Use of a branched alkyl alcohol ethoxylate oligomer of formula

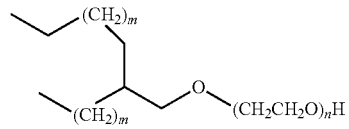

where m is 1 to 3 and n is an average number such that Mn is from about 1030 to about 2400, towards providing an aqueous coating composition comprising at least one latex polymer and water, increased open film time.

Further embodiments depending from embodiment 19 mirror those of embodiments 1-18.

The following Examples illustrate the invention. All parts and percentages are by weight unless otherwise indicated.

Example 1

Open Film Times in a Commercial Acrylic Latex Flat White Paint

2-Propylheptanol is ethoxylated as described in Satkowski and Hsu, Ind. Eng. Chem., 1957, 49(11), pp. 1875-1878. Ethoxylation is performed with KOH catalyst at elevated temperature and nitrogen atmosphere to achieve different degrees of ethoxylation. Samples 1-5 are prepared. Molecular weights are determined by gel permeation chromatography.

| Sample: | 1 | 2 | 3 | 4 | 5 |
|---|---|---|---|---|---|
| Mn: | 719 | 1065 | 1425 | 1765 | 2180 |

Likewise, a mixture of linear $C_{12}$-$C_{14}$ alcohols is ethoxylated with corresponding degrees of ethoxylation. Samples 6-10 are prepared.

| Sample: | 6 | 7 | 8 | 9 | 10 |
|---|---|---|---|---|---|
| Mn: | 742 | 1107 | 1492 | 1949 | 1685 |

The obtained ethoxylated 2-propylheptanol surfactants (1-5) are water soluble and are mixed at a 50% weight level with water. There is no gel formation and the solutions are easy to handle.

The linear alkyl alcohol ethoxylates (6-10) form a gel at all surfactant/water concentrations.

However, blends of 15% by weight ethoxylates (1-5) with 85% by weight of the corresponding linear $C_{12}$-$C_{14}$ alcohol ethoxylates (6-10) provides 50% by weight solutions with water that are free of gel formation. These are labeled samples 11-15.

A commercial acrylic latex flat white paint is obtained. The ethoxylated surfactants (50% in water) are post-added at a level of 5 lbs. per 100 gallon of paint. This equates to an additive level of 0.5% by weight surfactant based on the total paint composition. The paint samples are stirred and are allowed to equilibrate overnight and are stirred prior to testing. Addition of the surfactants did not cause grit or other signs of destabilization of the dispersions.

The open time test is performed as follows: A 10 mil blade Film Caster is used to drawdown a test paint on a black Leneta substrate. Immediately after drawing the sample, circular marks are scribed in the paint film. At 1 minute after the drawdown, brush strokes are delivered across the first mark. At equal time intervals, the next mark is brushed similarly. The process is continued until the edges of the mark cannot be "worked" into the film. If the mark cannot be completely worked the film is considered "closed". The results are as follows.

| Surfactant | Open Film Time (min) | HLB | Mn | Mw |
|---|---|---|---|---|
| none[a] | 2 | — | — | — |
| 1[a] | 4 | 15 | 719 | 800 |
| 2 | 6 | 17 | 1065 | 1152 |
| 3 | 8-9 | 18 | 1425 | 1514 |
| 4 | 6 | 18 | 1765 | 1866 |
| 5 | 10 | 18 | 2180 | 2280 |
| 11[a] | 6 | 14 | 739 | |
| 12 | 8 | 16 | 1101 | |
| 13 | 8 | 18 | 1482 | |
| 14 | 8 | 18 | 1921 | |
| 15 | 8 | 18 | 1759 | |

[a]comparison samples

It is seen that the surfactants according to the present invention, samples 2-5 and 12-15, provide for outstanding improvement in open film times.

Molecular weights are determined by gel permeation chromatography. It is seen that the present ethoxylate oligomers have a very narrow polydispersity, for instance from about 1.01 to about 1.15.

The invention claimed is:
1. An aqueous coating composition comprising:
a branched alkyl alcohol ethoxylate oligomer of formula

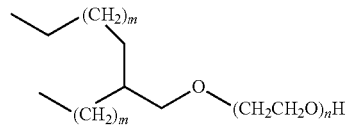

where m is 1 to 3 and n is an average number such that Mn is from about 1030 to about 2400;
at least one latex polymer; and
water.

2. A composition according to claim 1 where the HLB of the branched alkyl alcohol ethoxylate oligomer is 17 or above.

3. A composition according to claim 1 where in the branched alkyl alcohol ethoxylate oligomer, Mn is from about 1425 to about 2400 and the HLB is 18 or above.

4. A composition according to claim 1 where the branched alkyl alcohol ethoxylate oligomer is present from about 0.05% to about 5% by weight based on the total weight of the composition.

5. A composition according to claim 1 where the latex polymer is derived from at least one acrylic monomer selected from the group consisting of acrylic acid, acrylic acid esters, methacrylic acid and methacrylic acid esters and optionally one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid and ethylene.

6. A composition according to claim 1 where the latex polymer is present in the aqueous coating composition in an amount from about 5 to about 60 percent by weight dry latex polymer based on the total weight of the composition.

7. A composition according to claim 1 comprising one or more pigments selected from the group consisting of $TiO_2$, clay, $CaCO_3$, aluminum oxide, silicon dioxide, magnesium oxide, talc, barytes, zinc oxice, zinc sulfite, sodium oxide, potassium oxide and mixtures thereof.

8. A composition according to claim 7 where the pigments are present from about 5 to about 70 percent by weight based on the weight of the total composition.

9. A composition according to claim 1 which comprises essentially no alkyl phenol ethoxylate surfactants.

10. A composition according to claim 1 which comprises less than 3% by weight volatile organic compounds, based on the weight of the total composition.

11. A composition according to claim 1 which comprises essentially no volatile organic compounds.

12. A composition according to claim 1 where m is 2.

13. A composition according to claim 1 where in the branched alkyl alcohol ethoxylate oligomer, Mn is from about 1765 to about 2400 and the HLB is 18 or above.

14. A composition according to claim 1 where the branched alkyl alcohol ethoxylate oligomer is present from about 0.1% to about 3% by weight, based on the total weight of the composition.

15. A composition according to claim 1 where the branched alkyl alcohol ethoxylate oligomer is present from about 0.2 to about 2% by weight, based on the total weight of the composition.

16. A composition according to claim 1 where the branched alkyl alcohol ethoxylate oligomer is present from about 0.1% to about 1% by weight, based on the total weight of the composition.

17. A composition according to claim 1 where the latex polymer is derived from at least one acrylic monomer selected from the group consisting of acrylic acid, acrylic acid esters, methacrylic acid and methacrylic acid esters and one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid and ethylene.

18. A composition according to claim 1 where the latex polymer is present in the aqueous coating composition in an amount from about 10 to about 45 percent by weight dry latex polymer based on the total weight of the composition.

19. A composition according to claim 7 where the pigments are present from about 20 to about 70 percent by weight, based on the weight of the total composition.

20. A composition according to claim 1 which comprises no alkyl phenol ethoxylate surfactants.

21. A composition according to claim 1 which comprises less than 1% by weight volatile organic compounds, based on the weight of the total composition.

22. A composition according to claim 1 which comprises no volatile organic compounds.

* * * * *